(12) United States Patent
Feng

(10) Patent No.: US 11,169,436 B2
(45) Date of Patent: Nov. 9, 2021

(54) PROJECTING APPARATUS AND PROJECTING METHOD

(71) Applicant: HANGZHOU ZT MODEL CO., LTD., Hangzhou (CN)

(72) Inventor: Rui Feng, Hangzhou (CN)

(73) Assignee: Hangzhou ZT Model Co., Ltd., Hangzhou (CN)

(*) Notice: Subject to any disclaimer, the term of this patent is extended or adjusted under 35 U.S.C. 154(b) by 0 days.

(21) Appl. No.: 16/644,237

(22) PCT Filed: Feb. 15, 2019

(86) PCT No.: PCT/CN2019/075169
§ 371 (c)(1),
(2) Date: Jul. 9, 2020

(87) PCT Pub. No.: WO2020/140312
PCT Pub. Date: Jul. 9, 2020

(65) Prior Publication Data
US 2020/0401035 A1   Dec. 24, 2020

(30) Foreign Application Priority Data

Jan. 4, 2019 (CN) .......................... 201910010390.3

(51) Int. Cl.
*G03B 21/20* (2006.01)
*G03B 35/22* (2021.01)

(52) U.S. Cl.
CPC ......... *G03B 35/22* (2013.01); *G03B 21/2046* (2013.01); *G03B 21/2066* (2013.01)

(58) Field of Classification Search
CPC .... G03B 21/58; G03B 21/111; G03B 21/145; G03B 21/2013; G03B 21/2033;
(Continued)

(56) References Cited

U.S. PATENT DOCUMENTS

2002/0041139 A1* 4/2002 Opolka ................. H01K 1/26
                                                    313/316
2010/0296066 A1* 11/2010 Ou Yang ................ G03B 3/02
                                                    353/119
(Continued)

FOREIGN PATENT DOCUMENTS

CN           2127185 Y      2/1993
CN         103365048 A      7/2013
(Continued)

*Primary Examiner* — Sultan Chowdhury
(74) *Attorney, Agent, or Firm* — MacMillan, Sobanski & Todd, LLC

(57) ABSTRACT

A projecting apparatus and a projecting method, relates to the field of projecting technologies. The projecting apparatus includes: a light source (1), a projection film (2) and a lens (3), wherein the projection film (2) and the lens (3) are both located in a light path of the light source (1), a focal length of the lens (3) is greater than 0, and a positional relationship between the light source (1) and the lens (3) satisfies a formula:

$$0 \le E \le \left(\frac{216}{D}\right)^{0.8},$$

wherein E is a distance between the light source and the lens in centimeters; D is the focal length of the lens in centimeters, which solves the technical problem of high costs of 3D protection in the prior art, and can project a pattern on the projection film into a three-dimensional stereo image.

16 Claims, 4 Drawing Sheets

(58) Field of Classification Search
CPC ............ G03B 21/2046; G03B 21/2066; G03B 35/02; G03B 35/16; G03B 35/22; G03B 35/24; G03B 35/26; H04N 9/3141; H04N 9/3152; H04N 9/3155; H04N 9/3158; H04N 9/3161; H04N 9/3164
See application file for complete search history.

(56) References Cited

U.S. PATENT DOCUMENTS

2017/0192345 A1\* 7/2017 Somashankarappa ....................... G03B 21/001
2018/0348413 A1\* 12/2018 Imaoka .................. G02B 26/02

FOREIGN PATENT DOCUMENTS

| | | |
|---|---|---|
| CN | 103742814 A | 1/2014 |
| CN | 203759363 U | 3/2014 |
| CN | 207778127 U | 6/2017 |
| JP | 2000330204 A | 11/2000 |

\* cited by examiner

PROJECTING APPARATUS AND PROJECTING METHOD

Priority

This application is a U.S. national application of the international application number PCT/CN2019/075169 filed on Feb. 15, 2019, which claims priority of CN national application 201910010390.3 filed on Jan. 4, 2019, the contents of all of which are incorporated herein by reference.

TECHNICAL FIELD

The present disclosure relates to the field of projecting technologies, in particular to a projecting apparatus and a projecting method.

BACKGROUND ART

For existing 3D special effect projection products at present, the projection mode mainly adopts the DLP Link image technology, of which the principle is that a picture with a refresh rate of 120 Hz is output by a DMD chip, i.e. an optical digital processing chip, and left and right eyes are alternately used, so that 3D illusion is formed by human eyes, moreover, shutter 3D glasses need to be worn to watch the 3D effect. The existing 3D special effect projection products have the disadvantages of complex mode for realizing the 3D special effect and high costs of components.

SUMMARY

An object of the present disclosure includes providing a projecting apparatus and a projecting method, so as to solve the technical problem of high costs of 3D protection in the prior art.

In a first aspect, the present disclosure provides a projecting apparatus, including a light source, a projection film and a lens, wherein the projection film and the lens are both located in a light path of the light source, a focal length of the lens is greater than 0, and a positional relationship between the light source and the lens satisfies a formula:

$$0 \le E \le \left(\frac{216}{D}\right)^{0.8},$$

where E is a distance between the light source and the lens in centimeters; D is the focal length of the lens in centimeters.

In combination with the first aspect, the present disclosure provides a first possible embodiment of the first aspect, wherein the projecting apparatus includes a reflective sleeve, and the light source is coaxial with the reflective sleeve, and is connected inside the reflective sleeve.

In combination with the first possible embodiment of the first aspect, the present disclosure provides a second possible embodiment of the first aspect, wherein the projecting apparatus includes a lens frame, and the projection film and the lens are both connected with the lens frame.

In combination with the second possible embodiment of the first aspect, the present disclosure provides a third possible embodiment of the first aspect, wherein the reflective sleeve includes: a sleeve body and a ring plate, and the ring plate is connected with the sleeve body; the lens frame is provided therein with an annular slot, and the ring plate is inserted in the annular slot.

In combination with the third possible embodiment of the first aspect, the present disclosure provides a fourth possible embodiment of the first aspect, wherein a first annular plate and a second annular plate are connected in the lens frame, the annular slot is formed between the first annular plate and the second annular plate, inner diameters of the first annular plate and the second annular plate are both smaller than an outer diameter of the ring plate, outer diameters of the first annular plate and the second annular plate are both larger than an outer diameter of the ring plate, and the inner diameters of the first annular plate and the second annular plate are both larger than an outer diameter of the sleeve body.

In combination with the third possible embodiment of the first aspect, the present disclosure provides a fifth possible embodiment of the first aspect, wherein diameters of the projection film and the lens are both greater than the inner diameter of the sleeve body.

In combination with the second possible embodiment of the first aspect, the present disclosure provides a sixth possible embodiment of the first aspect, wherein the reflective sleeve is connected with the lens frame by insertion, a telescopic driving assembly is provided between the reflective sleeve and the lens frame, and the telescopic driving assembly is configured to drive the reflective sleeve to move along a radial direction of the lens frame.

In combination with the sixth possible embodiment of the first aspect, the present disclosure provides a seventh possible embodiment of the first aspect, wherein the telescopic driving assembly includes: a first telescopic cylinder and a second telescopic cylinder, an axis of the first telescopic cylinder is perpendicular to an axis of the second telescopic cylinder; the first telescopic cylinder is hinged between the reflective sleeve and the lens frame through a first hinge shaft; the second telescopic cylinder is hinged between the reflective sleeve and the lens frame through a second hinge shaft; an axis of the first hinge shaft and an axis of the second hinge shaft are both parallel to an axis of the reflective sleeve.

In combination with the first possible embodiment of the first aspect, the present disclosure provides an eighth possible embodiment of the first aspect, wherein the projection film is provided between the light source and the lens.

In combination with the first possible embodiment of the first aspect, the present disclosure provides a ninth possible embodiment of the first aspect, wherein the lens is provided between the light source and the projection film.

In combination with the second possible embodiment of the first aspect, the present disclosure provides a tenth possible embodiment of the first aspect, wherein an inner diameter of one end of the reflective sleeve close to the projection film is greater than an inner diameter of one end facing away from the projection film.

In combination with the second possible embodiment of the first aspect, the present disclosure provides an eleventh possible embodiment of the first aspect, wherein the light source is inserted in the reflective sleeve, and the light source can be, by being pushed and pulled, made to slide along an axis direction of the reflective sleeve.

In combination with the third possible embodiment of the first aspect, the present disclosure provides a twelfth possible embodiment of the first aspect, wherein the projection film is detachably connected with the lens frame, such that the projection film can be replaced.

In combination with the fourth possible embodiment of the first aspect, the present disclosure provides a thirteenth possible embodiment of the first aspect, wherein the lens frame includes two frame bodies, the two frame bodies are jointed to form the lens frame, and the ring plate is inserted in the annular slot.

In a second aspect, a projecting method is provided in the present disclosure, including the following steps:

enabling light emitted from a light source to pass through a projection film and a lens, and converging the light on a projection plane; and setting a distance between the light source and the lens in centimeters, E, based on $$0 \le E \le \left(\frac{216}{D}\right)^{0.8},$$

where D is a focal length of the lens in centimeters.

In combination with the second aspect, the present disclosure provides a first possible embodiment of the second aspect, wherein the projecting method further includes: moving the light source, the projection film or the lens along a radial direction of the lens, such that relative positions of the light source, the projection film and the lens in the radial direction of the lens are changed, thus, included angles between transmission directions of light, which successively passes through the same position on the projection film, after passing through the lens, and the axis of the lens are changed.

In combination with the second aspect, the present disclosure provides a second possible embodiment of the second aspect, wherein the projecting method further includes: enabling the light source to slide along an axis direction of the reflective sleeve, to change a position of the light source inside the reflective sleeve, thereby changing a diameter of light beams emitted through the reflective sleeve.

In combination with the second aspect, the present disclosure provides a third possible embodiment of the second aspect, wherein the projecting method further includes: moving the light source along the radial direction of the lens, to change an incident angle of light passing through the lens, thereby changing a position on the projection plane, to which position the light passing through a same position of the projection film irradiates.

In combination with the second aspect, the present disclosure provides a fourth possible embodiment of the second aspect, wherein the projecting method further includes: operating the reflective sleeve to enable the ring plate to slide along the annular slot, allowing the reflective sleeve to move along a radial direction of the lens frame, thereby changing the position on the projection film, to which position the light through the reflective sleeve is irradiated.

In combination with the second aspect, the present disclosure provides a fifth possible embodiment of the second aspect, wherein the projecting method further includes: driving a telescopic driving assembly to move along the radial direction of the lens frame, to change the incident angle, at which the light irradiating to the same position on the pattern is transmitted to the lens.

The embodiments of the present disclosure bring about the following beneficial effects: the projection film and the lens are both located in the light path of the light source, the focal length of the lens is greater than 0, and the positional relationship between the light source and the lens satisfies the formula:

$$0 \le E \le \left(\frac{216}{D}\right)^{0.8},$$

wherein E is the distance between the light source and the lens in centimeters; D is the focal length of the lens in centimeters, in the above manner, light emitted from the light source penetrates through the projection film, such that various light beams present brightness or color corresponding to the pattern, and various light beams are refracted by the lens, such that transmission directions of the light beams can be changed; when the light beams are projected onto the wall surface or the projection plane, an pattern on the projection film can be shown on the wall surface of the projection plane, and the pattern shown on the wall surface or the projection plane has a three-dimensional stereo effect.

In order to make the above objects, features and advantages of the present disclosure clearer and easier to understand, preferred embodiments are specifically illustrated below to make the following detailed description in combination with the accompanying drawings.

BRIEF DESCRIPTION OF DRAWINGS

In order to more clearly illustrate technical solutions in specific embodiments of the present disclosure or the related art, accompanying drawings which need to be used for description of the specific embodiments or the related art will be introduced briefly below, and apparently, the accompanying drawings in the following description merely show some embodiments of the present disclosure, and those ordinarily skilled in the art still could obtain other accompanying drawings in light of these accompanying drawings, without using inventive efforts.

Reference signs: 1—light source; 2—projection film; 3—lens; 4—reflective sleeve; 41—sleeve body; 42—ring plate; 5—lens frame; 51—annular slot; 52—first annular plate; 53—second annular plate; 6—three-dimensional image area; 7—non-special effect area; 8—projection plane; 9—telescoping driving assembly; 91—first telescoping cylinder; 92—second telescoping cylinder.

DETAILED DESCRIPTION OF EMBODIMENTS

Technical solutions of the present disclosure will be described clearly and completely below in connection with accompanying drawings. Apparently, the embodiments described are only a part of the embodiments of the present disclosure, rather than all embodiments. All other embodiments obtained by those ordinarily skilled in the art based on the embodiments of the present disclosure without using inventive efforts shall fall within the scope of protection of the present disclosure.

In the description of the present disclosure, it should be noted that orientation or positional relationships indicated by terms such as "center", "upper", "lower", "left", "right", "vertical", "horizontal", "inner" and "outer" are based on orientation or positional relationships as shown in the accompanying drawings, merely for facilitating describing the present disclosure and simplifying the description, rather than indicating or suggesting that related devices or elements have to be in the specific orientation or configured and operated in specific orientation, and therefore, they should not be construed as limitation on the present disclosure. Besides, terms "first", "second", and "third" are merely for descriptive purpose, but should not be construed as indicating or implying relative importance.

In the description of the present disclosure, it should be noted that unless otherwise specified and defined explicitly, terms "mount", "link", and "connect" should be construed in a broad sense. For example, it may be fixed connection, detachable connection, or integral connection; it may be mechanical connection, and also may be electrical connection; it may be direct connection, indirect connection via an intermediate medium, or inner communication between two elements. For those ordinarily skilled in the art, specific meanings of the above-mentioned terms in the present disclosure can be understood according to specific circumstances.

Embodiment 1

Figure 1:
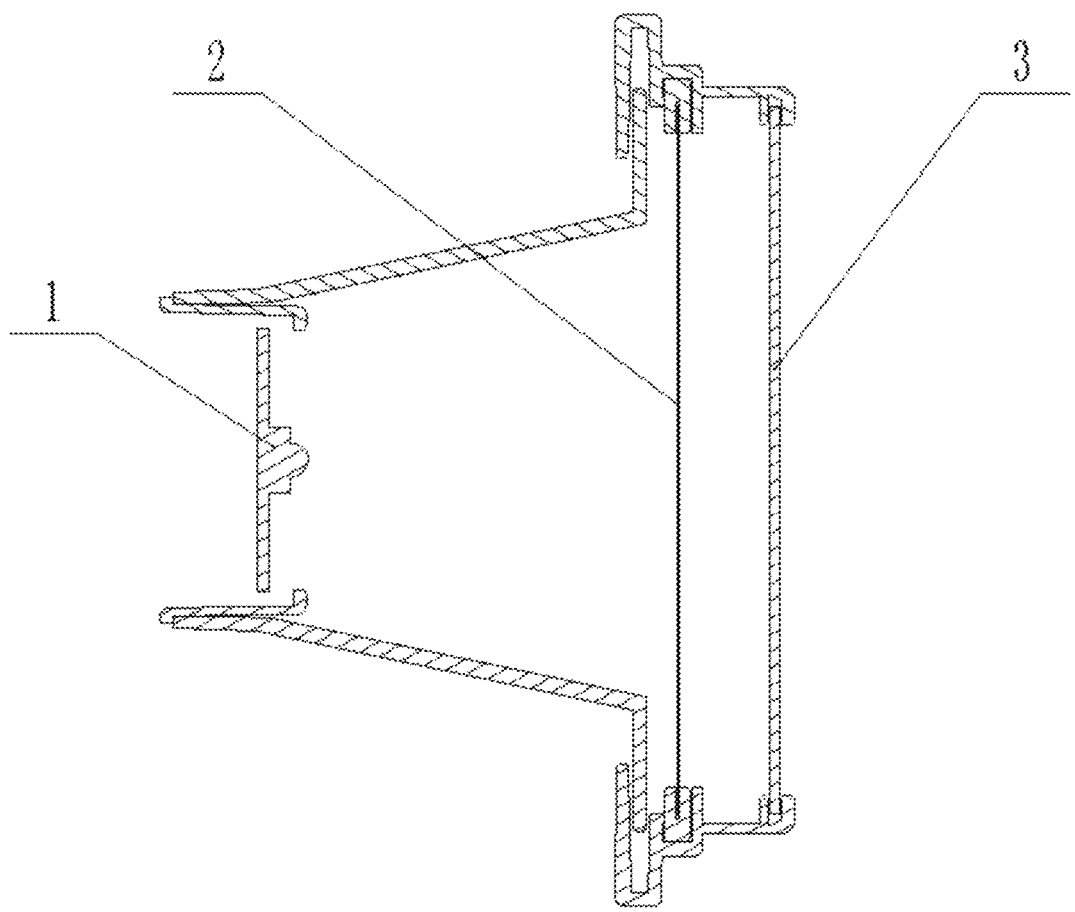
FIG. 1 is a first schematic diagram of a projecting apparatus provided in an embodiment of the present disclosure.

As shown in FIG. 1, a projecting apparatus provided in an embodiment of the present disclosure includes a light source 1, a projection film 2 and a lens 3, the projection film 2 and the lens 3 are both located in a light path of the light source 1, a focal length of the lens 3 is greater than 0, and a positional relationship between the light source 1 and the lens 3 satisfies a formula:

$$0 \leq E \leq \left(\frac{216}{D}\right)^{0.8},$$

wherein E is a distance between the light source 1 and the lens 3 in centimeters; D is the focal length of the lens 3 in centimeters.

Specifically, the light source 1 is a point light source, for example, an LED lamp, configured to emit light, and irradiate the light onto the lens 3 through the projection film 2; the projection film 2 is translucent or transparent, and is provided with a pattern. The projection film 2 is provided between the light source 1 and the lens 3, when light penetrates through the projection film 2, various light beams present brightness or color corresponding to the pattern, and then various light beams are refracted by the lens 3, such that transmission directions of the light beams are changed, and when the light beams are projected onto a wall surface or a projection plane 8, an image on the projection plane 8 presents an overlapping or deformation effect, thereby a three-dimensional stereo image can be presented; or, the lens 3 is provided between the light source 1 and the projection film 2, light passing through the lens 3 is converged, and the converged light passes through the projection film 2, along a radial direction of the lens 3, in a direction from an axis close to the lens 3 to an axis away from the lens 3, an included angle between the light and an axis of the lens 3 increases progressively, when light penetrates through the projection film 2 and irradiates on the wall surface or the projection plane 8, along a radial direction of the lens 3, in a direction from the axis close to the lens 3 to the axis away from the lens 3, the superposed effect of the image on the wall surface or the projection plane 8 increases progressively, so that an image edge is overlapped or deformed, and further a three-dimensional stereo image is presented.

Figure 2:
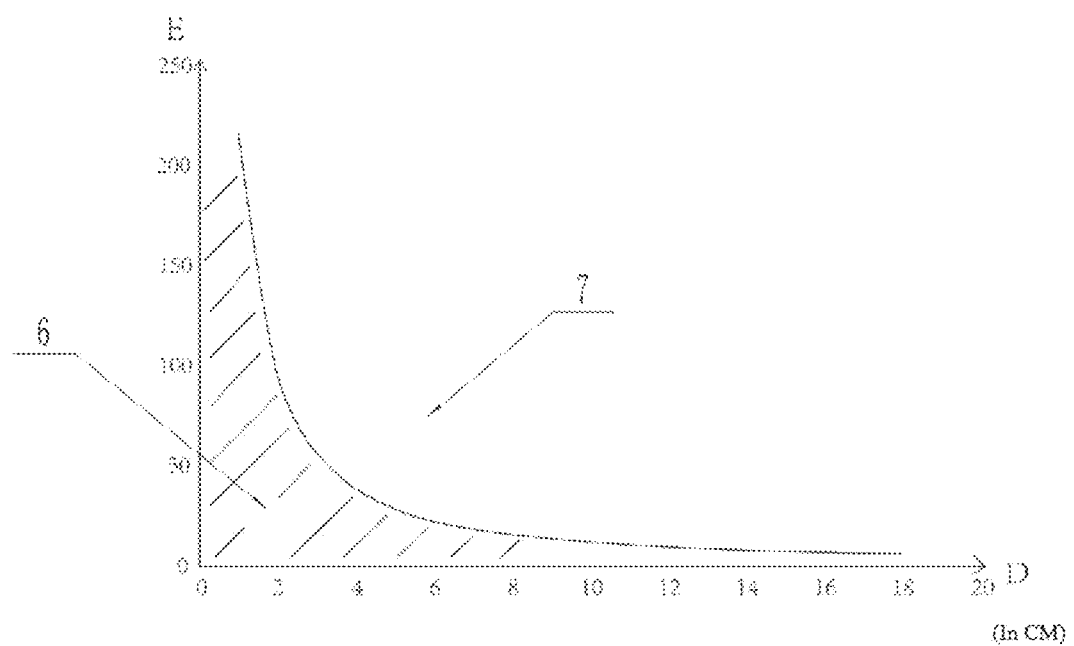
FIG. 2 is a curve of relationship between a distance from a light source to a lens and a focal length of the lens of the projecting apparatus provided in an embodiment of the present disclosure.

As shown in FIG. 2, in a range of a three-dimensional image area 6, the positional relationship between the projection film 2 and the lens 3 satisfies the following formula:

$$0 \leq E \leq \left(\frac{216}{D}\right)^{0.8},$$

and in a range of a non-special effect area 7, the positional relationship between the projection film 2 and the lens 3 satisfies the following formula:

$$E > \left(\frac{216}{D}\right)^{0.8},$$

wherein E is the distance between the light source 1 and the lens 3, and D is the focal length of the lens 3, at this time, the light beams are projected onto the wall surface or the projection plane 8 to present a two-dimensional pattern, a distorted deformed pattern, or no pattern.

In an embodiment of the present disclosure, the projecting apparatus includes a reflective sleeve 4, and the light source 1 is coaxial with the reflective sleeve 4 and is connected inside the reflective sleeve 4. Specifically, an inner diameter of one end of the reflective sleeve 4 close to the projection film 2 is greater than an inner diameter of one end facing away from the projection film 2, and an inner side wall of the reflective sleeve 4 is provided with a mirror surface, configured to reflect light emitted from the light source 1, thereby ensuring that the light emitted from the light source 1 is transmitted towards the projection film 2 and the lens 3 along an axis direction of the reflective sleeve 4. The light source 1 is inserted in the reflective sleeve 4, and the light source 1 can be, by being pushed and pulled, made to slide along the axis direction of the reflective sleeve 4 to change the position of the light source 1 inside the reflective sleeve 4, thereby the diameter of light beams emitted through the reflective sleeve 4 can be changed. When the light source 1 moves along the axis direction of the reflective sleeve 4 towards the direction close to the projection film 2, the diameter of the light beams emitted through the reflective sleeve 4 is decreased gradually; when the light source 1 moves along the axis direction of the reflective sleeve 4 towards the direction facing away from the projection film 2, the diameter of the light beams emitted through the reflective sleeve 4 is increased gradually. By changing the diameter of the light beams emitted through the reflective sleeve 4, the diameter of the light beams can be allowed to be adapted to the size of the pattern on the projection film 2.

Figure 3:
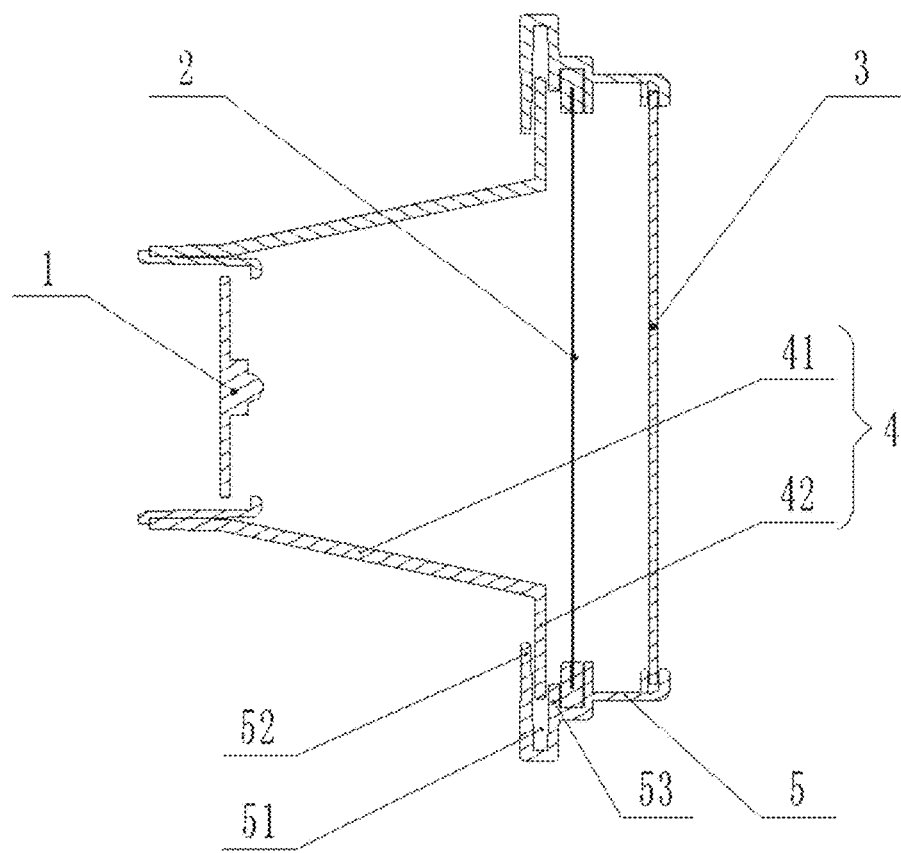
FIG. 3 is a second schematic diagram of the projecting apparatus provided in an embodiment of the present disclosure.

As shown in FIG. 3, the projecting apparatus includes a lens frame 5, and the projection film 2 and the lens 3 are both connected with the lens frame 5, wherein the projection film 2 is detachably connected with the lens frame 5, and by replacing the projection film 2 having different patterns, different patterns can be projected.

Further, the reflective sleeve 4 includes: a sleeve body 41 and a ring plate 42, and the ring plate 42 is connected with the sleeve body 41; the lens frame 5 is provided therein with an annular slot 51, and the ring plate 42 is inserted in the annular slot 51. In the above, the lens frame 5 includes two frame bodies with a section in a semicircular shape, the two frame bodies are jointed to form the lens frame 5 with a section in an annular shape, and the ring plate 42 is inserted in the annular slot 51, so as to realize connection between the reflective sleeve 4 and the lens frame 5. Light is transmitted to the projection film 2 and the lens 3 along the axis direction of the reflective sleeve 4 and the lens frame 5, and light can be prevented from scattering through the reflective sleeve 4 and the lens frame 5.

Figure 4:
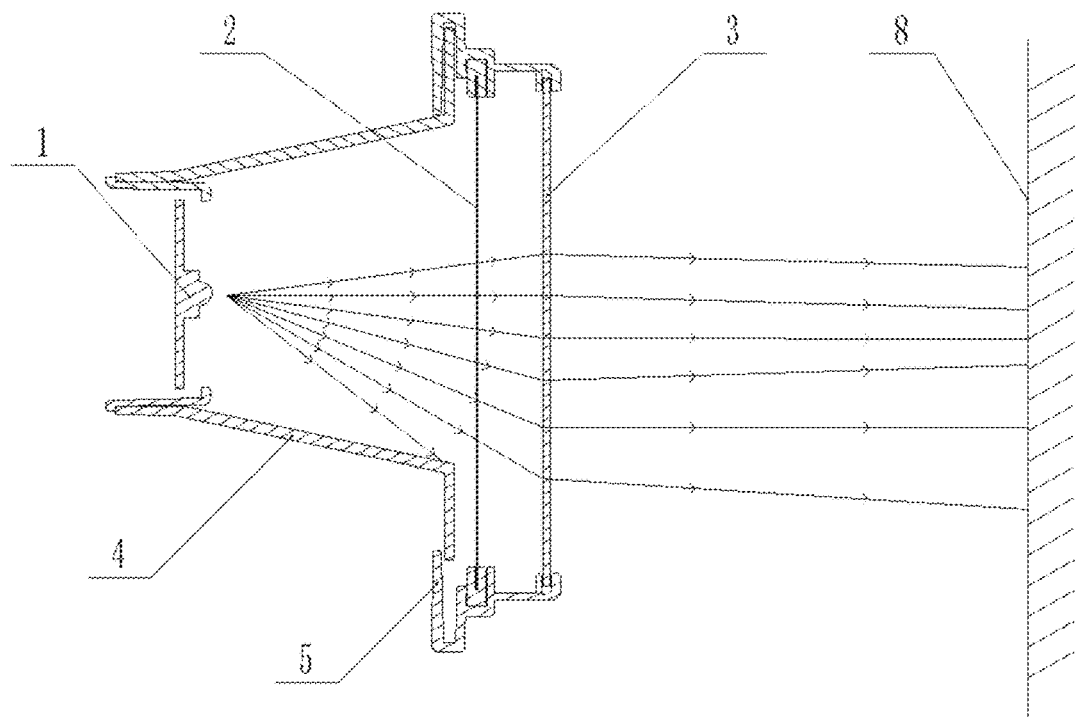
FIG. 4 is a third schematic diagram of the projecting apparatus provided in an embodiment of the present disclosure.
Figure 5:
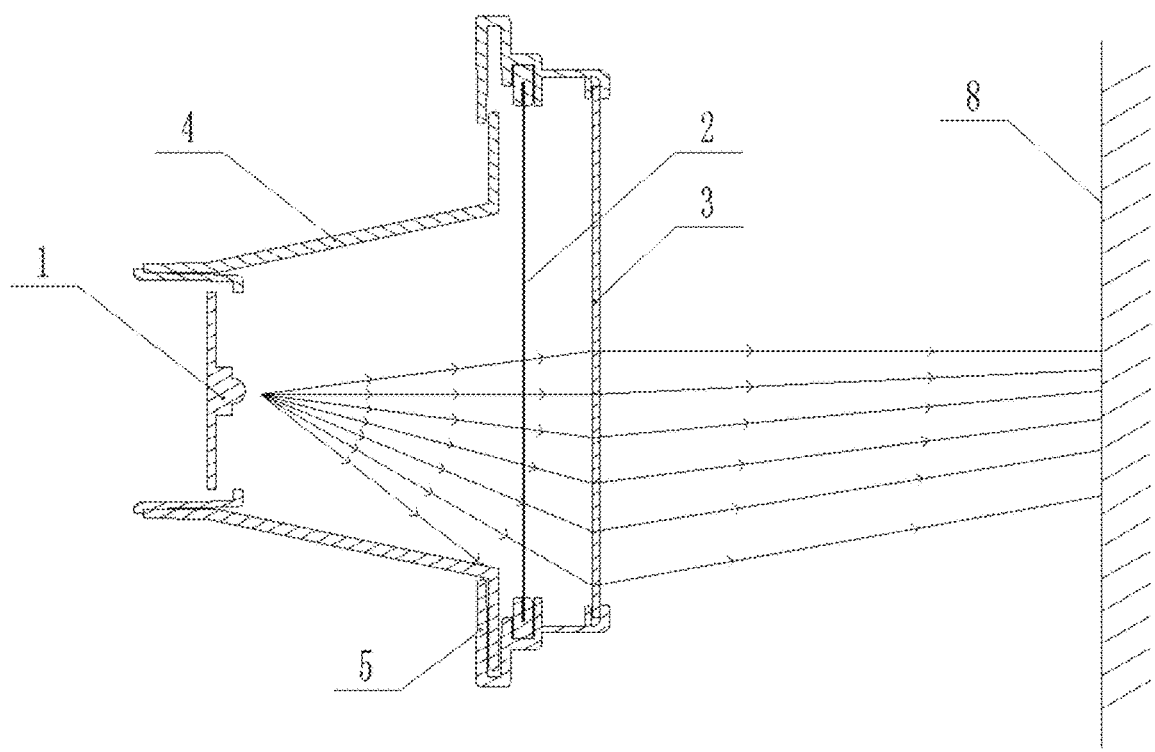
FIG. 5 is a fourth schematic diagram of the projecting apparatus provided in an embodiment of the present disclosure.

As shown in FIG. 3, FIG. 4 and FIG. 5, a first annular plate 52 and a second annular plate 53 are connected in the lens frame 5, the annular slot 51 is formed between the first annular plate 52 and the second annular plate 53, inner diameters of the first annular plate 52 and the second annular plate 53 are both smaller than an outer diameter of the ring plate 42, outer diameters of the first annular plate 52 and the second annular plate 53 are both larger than an outer diameter of the ring plate 42, and the inner diameters of the first annular plate 52 and the second annular plate 53 are both larger than an outer diameter of the sleeve body 41. The reflective sleeve 4 is manually operated to enable the ring plate 42 to slide along the annular slot 51, further, the reflective sleeve 4 can be allowed to move along a radial direction of the lens frame 5, thereby changing the position on the projection film 2, to which position the light through the reflective sleeve 4 is irradiated. The reflective sleeve 4 is moved at a slow speed, and the light beams passing through the same position on the pattern have different incident angles irradiated onto the lens 3 within a certain time, so that the position of the light beams irradiated onto the wall surface or the projection plane 8 is changed. Taking the configuration of a circular pattern on the projection film 2 as an example, when the reflective sleeve 4 moves relative to the projection film 2, a spherical image projected onto the wall surface or the projection plane 8 presents a scrolling pattern, thereby forming a dynamic three-dimensional effect.

Further, diameters of the projection film 2 and the lens 3 are both greater than the inner diameter of the sleeve body 41, thus ensuring that the light transmitted out through the sleeve body 41 can be irradiated onto the projection film 2 and the lens 3, so as to make full use of the light, and prevent light from irradiating a shading object to cause heat-up of the device.

Figure 6:
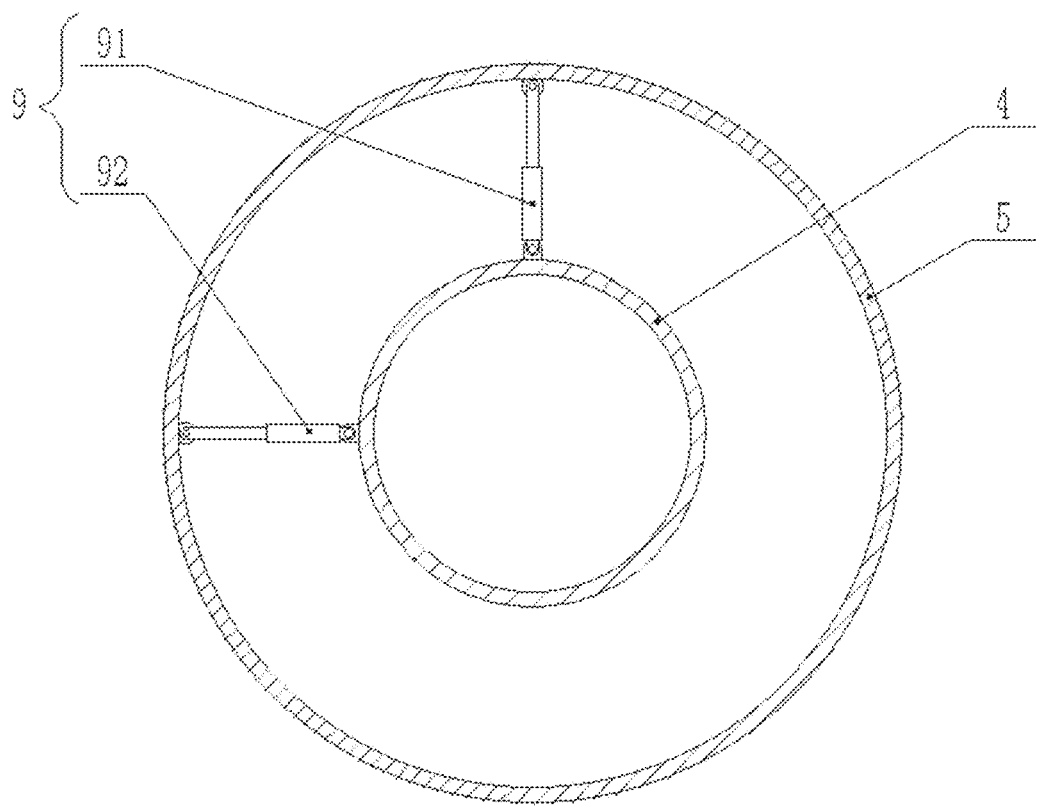
FIG. 6 is a schematic diagram of a reflective sleeve, a lens frame and a telescoping driving assembly of the projecting apparatus provided in an embodiment of the present disclosure.

As shown in FIG. 6, the reflective sleeve 4 is connected with the lens frame 5 by insertion, a telescopic driving assembly 9 is provided between the reflective sleeve 4 and the lens frame 5, and the telescopic driving assembly 9 is configured to drive the reflective sleeve 4 to move along the radial direction of the lens frame 5. The telescopic driving assembly 9 can be driven to move along the radial direction of the lens frame 5, further changing the incident angle, at which the light irradiating to the same position on the pattern is transmitted to the lens 3, and thus forming a dynamic three-dimensional figure.

Further, the telescopic driving assembly 9 includes: a first telescopic cylinder 91 and a second telescopic cylinder 92, an axis of the first telescopic cylinder 91 is perpendicular to an axis of the second telescopic cylinder 92; the first telescopic cylinder 91 is hinged between the reflective sleeve 4 and the lens frame 5 through a first hinge shaft; the second telescopic cylinder 92 is hinged between the reflective sleeve 4 and the lens frame 5 through a second hinge shaft; an axis of the first hinge shaft and an axis of the second hinge shaft are both parallel to the axis of the reflective sleeve 4. Through extension or shortening of the first telescopic cylinder 91 and the second telescopic cylinder 92, the reflective sleeve 4 can be enabled to move along the radial direction of the lens frame 5, so that the image on the projection film 2 is mapped on the wall surface or the projection plane 8 and is dynamically turned over.

Embodiment 2

A projecting method provided in an embodiment of the present disclosure includes following steps:

enabling light emitted from a light source 1 to pass through a projection film 2 and a lens 3, and converging the light on a projection plane 8; and setting a distance between the light source 1 and the lens 3 in centimeters, E, based on $$0 \le E \le \left(\frac{216}{D}\right)^{0.8},$$

wherein D is a focal length of the lens 3 in centimeters. At this time, the pattern projected on the projection plane 8 is deformed by refraction of light to present a three-dimensional effect.

In an embodiment of the present disclosure, the projecting method further includes: moving the light source 1, the projection film 2 or the lens 3 along a radial direction of the lens 3, such that relative positions of the light source 1, the projection film 2 and the lens 3 in the radial direction of the lens 3 are changed, thus, included angles between transmission directions of light, which successively passes through the same position on the projection film 2, after passing through the lens 3, and the axis of the lens 3 are changed. Specifically, the light of the light source 1 diverges from one side facing away from the projection plane 8 to one side close to the projection plane 8, when the light source 1 is moved along the radial direction of the lens 3, an incident angle of the light passing through the lens 3 is changed, so that the position of the light, which passes through the same position of the projection film 2, irradiating on the projection plane 8 can be changed, and when the light source 1 continuously moves along the radial direction of the lens 3, the image on the projection plane 8 presents a rolling dynamic effect; likewise, when the light source 1 or the projection film 2 is moved along the radial direction of the lens 3, two beams of light passing through the same position of the projection film 2 successively within a certain time can be allowed to irradiate on different positions on the projection plane 8, so that a dynamic three-dimensional image is formed on the projection plane 8.

Finally, it should be explained that the various embodiments above are merely used for illustrating the technical solutions of the present disclosure, rather than limiting the present disclosure; while the detailed description is made to the present disclosure with reference to various preceding embodiments, those ordinarily skilled in the art should understand that they still can modify the technical solutions recited in various preceding embodiments, or make equivalent substitutions to some or all of the technical features therein; these modifications or substitutions do not make the corresponding technical solutions essentially depart from the scope of the technical solutions of various embodiments of the present disclosure.

INDUSTRIAL APPLICABILITY

The projecting apparatus provided in the present disclosure solves the technical problem of high costs of 3D protection in the prior art. The components used in the present disclosure are simple in structures, easy to maintain, and low in cost, and simple and effective operations can be used. With the projecting apparatus provided in the present disclosure, the pattern on the projection film is projected into a dynamic three-dimensional stereo image.

What is claimed is:

1. A projecting apparatus, comprising a light source, a projection film and a lens, wherein the projection film and the lens are both located in a light path of the light source, a focal length of the lens is greater than 0, and a positional relationship between the light source and the lens satisfies a formula:

$$0 \le E \le \left(\frac{216}{D}\right)^{0.8},$$

wherein E is a distance between the light source and the lens in centimeters; D is the focal length of the lens in centimeters, wherein the projecting apparatus comprises a reflective sleeve, the light source is coaxial with the reflective sleeve, and is connected inside the reflective sleeve, and an inner diameter of one end of the reflective sleeve close to the projection film is greater than an inner diameter of one end facing away from the projection film.

2. The projecting apparatus according to claim 1, wherein the projecting apparatus comprises a lens frame, and the projection film and the lens are both connected with the lens frame.

3. The projecting apparatus according to claim 2, wherein the reflective sleeve comprises: a sleeve body and a ring plate, and the ring plate is connected with the sleeve body; the lens frame is provided therein with an annular slot, and the ring plate is inserted in the annular slot.

4. The projecting apparatus according to claim 3, wherein a first annular plate and a second annular plate are connected in the lens frame, the annular slot is formed between the first annular plate and the second annular plate, inner diameters of the first annular plate and the second annular plate are both smaller than an outer diameter of the ring plate, outer diameters of the first annular plate and the second annular plate are both larger than the outer diameter of the ring plate, and the inner diameters of the first annular plate and the second annular plate are both larger than an outer diameter of the sleeve body.

5. The projecting apparatus according to claim 3, wherein diameters of the projection film and the lens are both greater than an inner diameter of the sleeve body.

6. The projecting apparatus according to claim 2, wherein the reflective sleeve is connected with the lens frame by insertion, a telescopic driving assembly is provided between the reflective sleeve and the lens frame, and the telescopic driving assembly is configured to drive the reflective sleeve to move along a radial direction of the lens frame.

7. The projecting apparatus according to claim 6, wherein the telescopic driving assembly comprises: a first telescopic cylinder and a second telescopic cylinder, wherein an axis of the first telescopic cylinder is perpendicular to an axis of the second telescopic cylinder;

the first telescopic cylinder is hinged between the reflective sleeve and the lens frame through a first hinge shaft; the second telescopic cylinder is hinged between the reflective sleeve and the lens frame through a second hinge shaft; and an axis of the first hinge shaft and an axis of the second hinge shaft are both parallel to an axis of the reflective sleeve.

8. The projecting apparatus according to claim 1, wherein the projection film is provided between the light source and the lens.

9. The projecting apparatus according to claim 1, wherein the light source is inserted in the reflective sleeve, and the light source is, by being pushed and pulled, made to slide along an axis direction of the reflective sleeve.

10. The projecting apparatus according to claim 2, wherein the projection film is detachably connected with the lens frame, such that the projection film is replaceable.

11. The projecting apparatus according to claim 3, wherein the lens frame comprises two frame bodies, the two frame bodies are jointed to form the lens frame, and the ring plate is inserted in the annular slot.

12. A projecting method, comprising following steps:
enabling light emitted from a light source to pass through a projection film and a lens, and converging the light onto a projection plane; and
setting a distance between the light source and the lens in centimeters, E, based on $$0 \le E \le \left(\frac{216}{D}\right)^{0.8},$$

wherein D is a focal length of the lens in centimeters,
wherein the projecting method further comprises:
enabling the light source to slide along an axis direction of a reflective sleeve, to change a position of the light source inside the reflective sleeve, thereby changing a diameter of light beams emitted through the reflective sleeve.

13. The projecting method according to claim 12, wherein the projecting method further comprises:
moving the light source, the projection film or the lens along a radial direction of the lens.

14. The projecting method according to claim 13, wherein the projecting method further comprises:
moving the light source along the radial direction of the lens, to change an incident angle of light passing through the lens, thereby changing a position on the projection plane, to which position the light passing through a same position of the projection film irradiates.

15. The projecting method according to claim 13, wherein the projecting method further comprises:
   operating the reflective sleeve to enable a ring plate to slide along an annular slot, to allow the reflective sleeve to move along a radial direction of a lens frame, thereby changing a position on the projection film, to which position the light through the reflective sleeve is irradiated.

16. The projecting method according to claim 13, wherein the projecting method further comprises:
   driving a telescopic driving assembly to move along the radial direction of the lens frame, to change an incident angle, at which the light irradiating to a same position on a pattern is transmitted to the lens.

* * * * *